United States Patent [19]

Schneider

[11] 3,879,296

[45] Apr. 22, 1975

[54] DECANTER

[75] Inventor: August Johannes Schneider, Mallorca, Spain

[73] Assignee: Escher Wyss Limited, Zurich, Switzerland

[22] Filed: Sept. 7, 1973

[21] Appl. No.: 395,231

[30] Foreign Application Priority Data
Sept. 12, 1972 Switzerland.................... 013323/72

[52] U.S. Cl.............. 210/512 R; 210/519; 210/521
[51] Int. Cl. ............................................. B04c 5/26
[58] Field of Search........ 210/294, 322, 512 R, 521, 210/522, 323, 340, 519

[56] References Cited
UNITED STATES PATENTS

| 349,990 | 9/1886 | Gaillet et al. ...................... 210/521 |
| 2,207,399 | 7/1940 | Gaertner.......................... 210/521 X |
| 2,793,186 | 5/1957 | Dunell et al. ...................... 210/521 |
| 3,182,799 | 5/1965 | Krofta............................. 210/521 X |
| 3,440,806 | 4/1969 | Damratowski............. 210/512 R X |
| 3,687,298 | 8/1972 | Rozkydalek.................... 210/522 X |
| 3,754,656 | 8/1973 | Horiguchi et al.............. 210/521 X |

Primary Examiner—John Adee
Assistant Examiner—Robert H. Spitzer
Attorney, Agent, or Firm—Robert A. Ostmann

[57] ABSTRACT

A decanter for clarifying a sludge and composed of a plurality of superimposed separating chambers connected in parallel; a sediment zone and a clear liquid zone being formed from a sludge zone which begins on the entry side section in each separating chamber; for carrying the clear liquid out of each separating chamber, a duct leads from the clear liquid zone along the sludge zone and through the entry side section of the separating chamber to a collecting pipe or header for the clear liquid.

9 Claims, 4 Drawing Figures

DECANTER

BACKGROUND OF THE INVENTION

The invention relates to a decanter for clarifying a sludge and composed of a plurality of superimposed separating chambers connected in parallel, a sediment zone and a clear liquid zone being formed from a sludge zone in the respective separating chambers, for which purpose the separating chamber comprises a sloping plate, on which the sediment settles and slides down, there also being an inflow opening for the sludge in that part of the separating chamber which is on the entry side and a discharge opening for the sediment on that rim of the sloping plate which is on the outlet side.

When there are large throughput volumes of sludge to be clarified, considerable decantation surfaces are necessary. So as to save space and possibly also to prevent heat losses, a plurality of individual separating chambers are superimposed, as initially described. In this case, the admission in parallel of the sludge to the individual separating chambers and the carrying away of the already separated components from the separating chambers necessitates complicated conduction paths. With one known decanter, the conduction paths intersect for example at the outlet end of the separating chambers, as a result of which some of the solid particles are once again mixed with the clear liquid. This produces an incomplete clarification and the clear liquid still containing solid particles possibly has to be cleaned again.

SUMMARY OF THE INVENTION

The invention has for its object so to improve the decanter as initially described that the decanter is more simple and the clear liquid is obtained free from solid substance.

The object as set forth is achieved according to the invention in the initially defined decanter by the fact that, for carrying the clear liquid from the separating chamber, a duct leads from the clear liquid zone along the sludge zone and through the entry section of the separating chamber to a collecting pipe or leader for the clear liquid, advantageously in such a way that the duct is formed by inserting a partition which extends at a distance from the sloping plate.

A particularly simple and compact decanter according to the invention is so designed that the separating chamber is made as an axially symmetrical annular chamber, the sloping plate having the form of a frusto-concial shell and the partition defining the duct for the clear liquid having the form of a frusto-conical shell concentric with the separating chamber, and also advantageously in such a way that the wall defining the outlet side of the annular separating chamber has the form of a frusto-conical shell and is connected to the rim on the outlet side of the next upper sloping plate, and that the sloping plates formed in this case as frusto-conical shells narrowing in the downward direction are superimposed, while the rim on the outlet side of a sloping plate has always a larger diameter than the rim on the outlet side of the next upper sloping plate.

An advantageous admission of the sludge to the decanter is achieved by the fact that the pipe is provided for the sludge which is to be clarified, which pipe feeds the sludge to the inflow openings tangentially to the rim of the sloping plate on the entry side and into the separating chambers.

Flow conditions in the duct leading from the clear liquid zone to a collecting pipe for the clear liquid are preferably so arranged that the partition defining the duct extends parallel to the sloping plate, or that the partition extends at an inclination to the sloping plate, at least in one section.

BRIEF DESCRIPTION OF THE DRAWING

The method of construction and operation of the decanter according to the invention is hereinafter more fully described and explained by reference to the four FIGS., wherein.

DESCRIPTION OF ILLUSTRATED EMBODIMENTS

Figure 1:
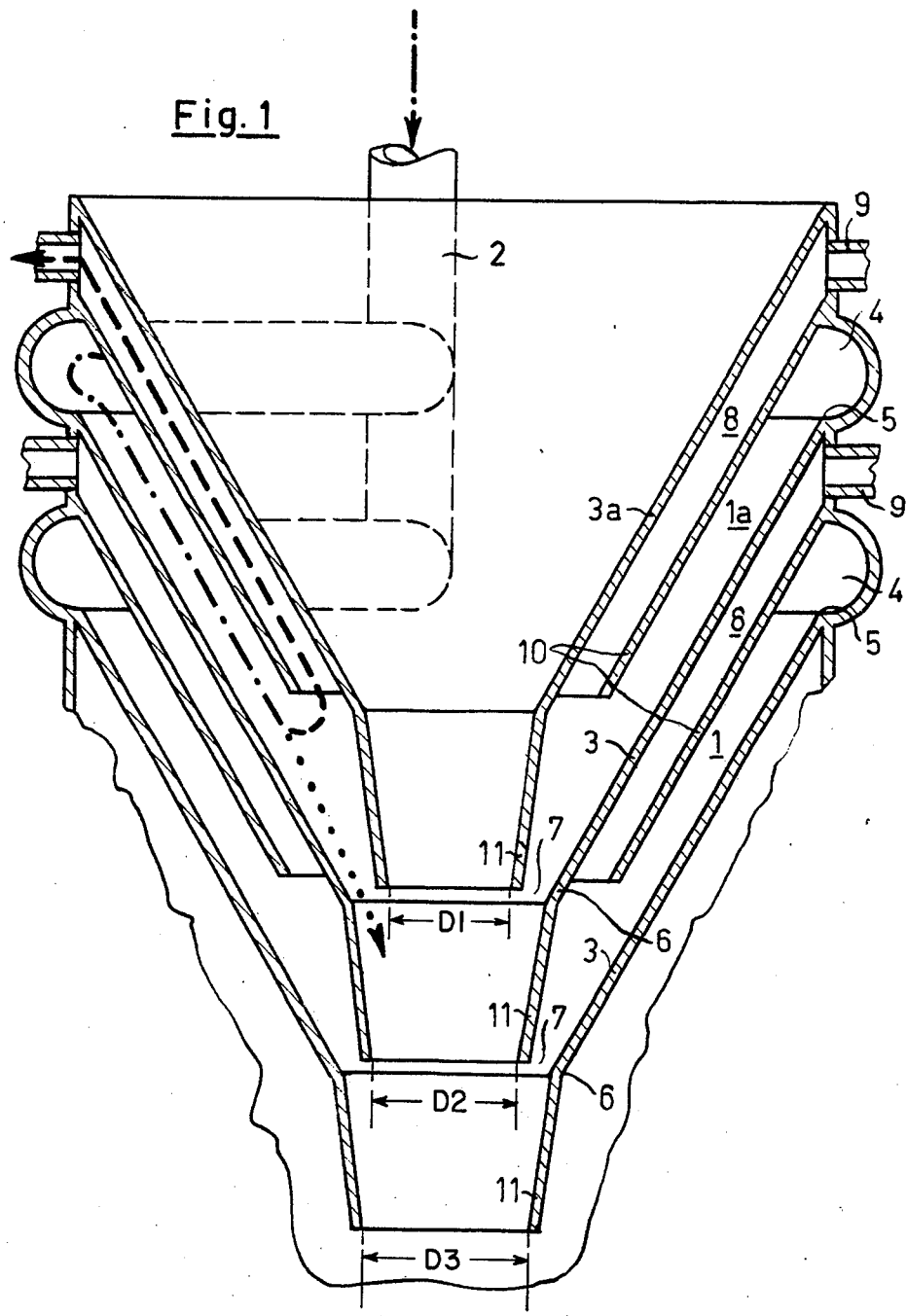
FIG. 1 shows a part of a first constructional form of the decanter according to the invention in cross-section.

The decanter is designed for clarifying a sludge by decantation and is composed of a plurality of closed separating chambers 1 stacked one upon the other. As regards the pipe for the supply of the sludge (this pipe 2 is shown in broken lines in FIG. 1), the separating chambers 1 of the decanter are connected in parallel, and the decantation thus proceeds concurrently in the separating chambers 1. As shown diagrammatically in FIG. 3, the sludge to be clarified flows through the part of the separating chamber on the entry side into a sludge zone T.

On the way, the solid particles contained in the sludge are sedimented from the sludge zone T and there is gradually formed a sediment zone S with the sediment of solid particles and a clear liquid zone K, without solid particles in the clear liquid. In that section of the separating chamber 1 which is on the exit side, there is now the clear liquid zone K and the sediment zone S. The separating chamber 1 of the decanter is situated between each two superimposed, inclined sloping plates 3. The solid particles from the sludge are deposited on the sloping plate 3 and the sediment gradually slides along the descent lines of the inclined surface of the sloping plate 3. The sediment slides downwardly because of the force of gravity. Arranged in the upper entry side section of the separating chamber 1 and on that rim 5 of the sloping plate 3 which is on the entry side are inflow openings 4 for the sludge, through which opens the sludge pipe 2 connected parallel to the separating chambers 1. Disposed in the lower outlet side section of the separating chamber 1 on that rim 6 of the sloping plate 3 which is on the outlet side are discharge openings 7 for the sediment. For carrying the clear liquid out of the separating chamber 1, a duct 8 leads from the clear liquid zone K of the separating chamber 1 along the sludge zone T and through the entry side section of the separating chamber 1 to a collecting pipe or header for the clear liquid, of which the unions or necks are indicated at 9.

The duct 8 is formed by insertion of a partition 10 extending at a spacing from the plate 3. Instead of the duct 8 defined by the partition 10, it would however be possible to visualise, for example, a plurality of pipes as ducts.

Figure 2:
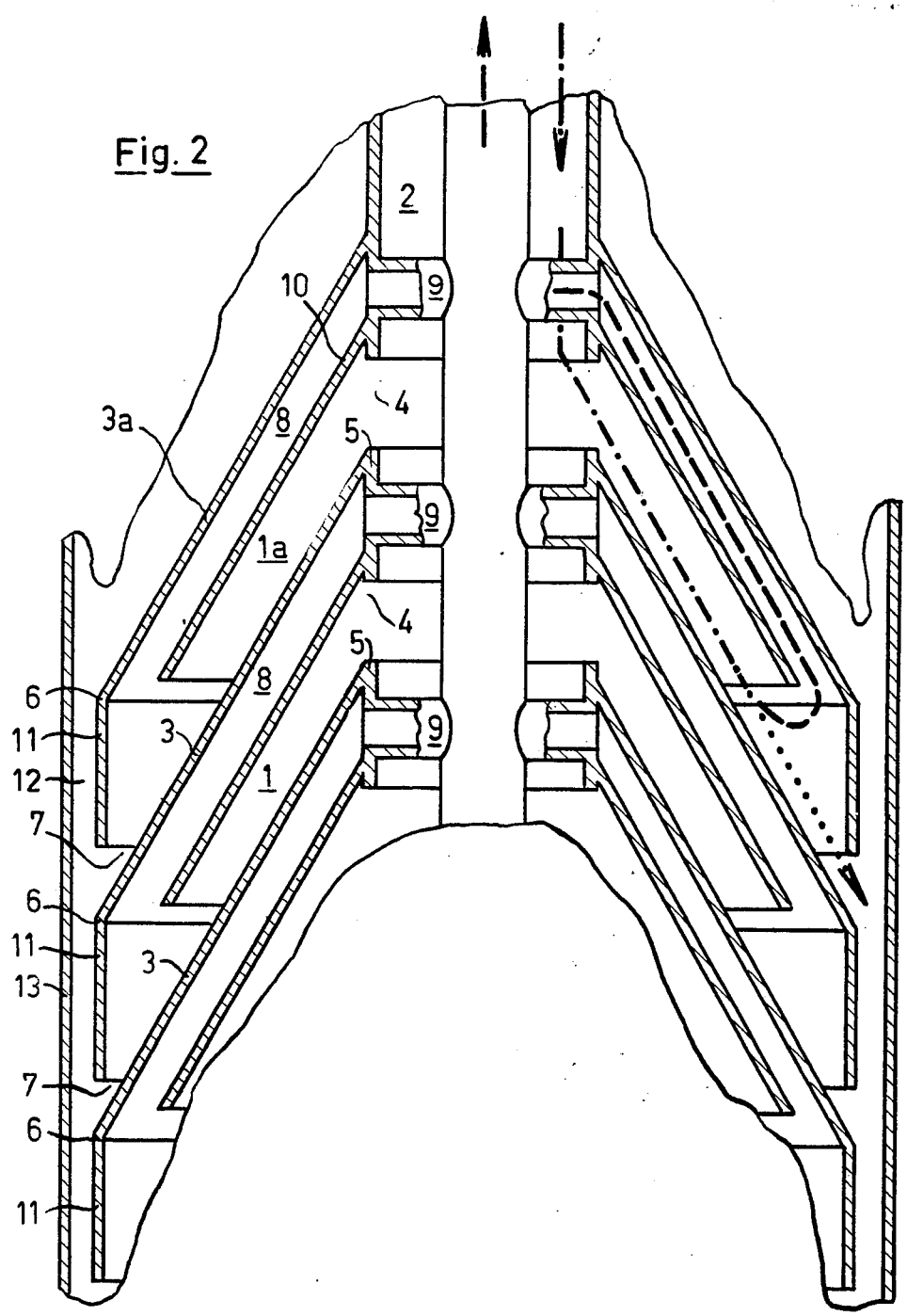
FIG. 2 shows a part of another constructional form in cross-section.

The direction of flow of the sludge is shown in FIG. 1 and 2 by chain-dotted lines, that of the sediment by dotted lines and that of the clear liquid by broken lines, and each are indicated by arrows.

The separating chambers 1 are constructed as axially symmetrical annular chambers, the plates 3 having the form of a frusto-conical shell. The annular chambers are superimposed. A plate 3a disposed at the uppermost end forms a cover of the decanter above the uppermost separating chamber 1a.

The partition 10 which defines the duct 8 also has the form of a frusto-conical shell and is concentric with the separating chamber 1. Consequently, the duct 8 is also an axially symmetrical annular chamber.

Those walls 11 which define the separating chambers 1 on the outlet side have the form of an almost cylindrical frusto-conical shell. The walls 11 define the separating chambers 1 on the outlet side by each being connected to the outlet side rim 6 of the next upper plate 3 of the next upper separating chamber 1. In order to leave free a chamber for the sediment which increases in size in the downward direction, the frusto-conical shell form of these walls 11, which are similar to one another, comprises with each next lower wall 11 a somewhat larger diameter D (D1, D2, D3, etc.), than the next upper wall 11.

For the complete admission of the sludge to the entire annular separating chamber 1, the pipe 2 for the sludge opens into the inflow openings 4 tangentially to the inlet side rim 5 of the sloping plate 3 into the separating chamber 1 at several points on the circumference. The tangentially introduced sludge flows first of all in the tangential direction to the inlet side rim 5, which direction gradually changes into a direction along the descent lines of the sloping plate 3 radially to the middle of the decanter. No turbulent flow is established, because of the speed of the stream flowing from the pipe 2 tangentially into the separating chamber 1 is preferably kept small.

In the decanter according to FIG. 2, the pipe 2 for the suply of the sludge is disposed centrally. From the inflow openings 4, the sludge to be clarified flows in a substantially radially outward direction through the separating chamber 1. The sediment discharges from the separating chamber 1 through the discharge openings 7 for the sediment and into a shaft 12 for the sediment, which is left free between those walls 11 which define the separating chambers 1 on the outlet side and a cylindrical shell 13.

Figure 3:
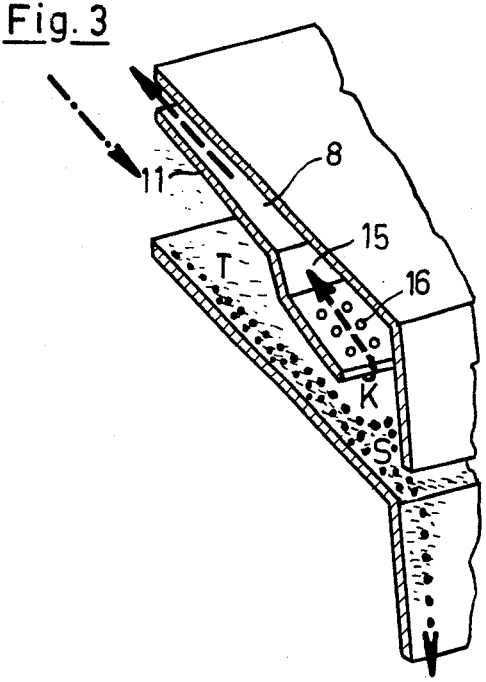
FIG. 3 shows a constructional form of the partition.
Figure 4:
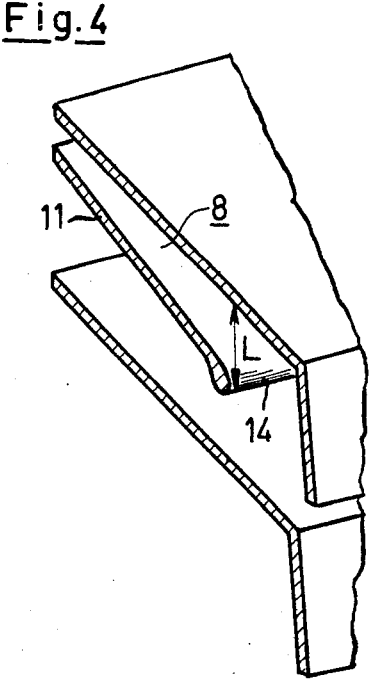
FIG. 4 shows another constructional form of the partition as an axonometric diagram.

The different constructional forms of the partition 10 defining the duct 8 in FIGS. 3 and 4 show how a desired and expedient flow formation is to be obtained in the duct 8. In that section of the separating chamber 1 which is on the outlet side, there is in fact a diversion of the flow of the clear liquid into the duct 8, and in a direction opposite to the direction of flow in the separating chamber 1. At the point of diversion, it is desirable to have a flow which is as steady and as slow as possible, so that the solid particles from the sediment zone are not stirred up and drawn back into the flow of the clear liquid. For this reason, the internal width L at the beginning of the duct 8 is as large as possible and the edge of the partition 10 at the beginning of the duct 8 is given the correct streamlined form.

Further in the direction of flow of the clear liquid in the duct 8, as indicated by the arrow, the internal width L of the duct 8 gradually decreases.

The shape of the partition 10 in FIG. 3 leaves free a zone of a slow flow in the duct 8 before a step 15.

It is also possible to provide a part of the partition 10 with openings 16 in the vicinity of the edge 14. In this way, a part of the clear liquid from the clear liquid zone K already formed immediately beneath the partition 10 penetrates into the duct 8 around the edge 14 already before the diversion of the main flow of the clear liquid.

So far, a decanter consisting of annular separating chambers has been shown. However, it is also possible for the decanter according to the invention to be assembled from separating chambers having a rectangular outline.

I claim:

1. A decanter for clarifying a sludge comprising
   a. a group of vertically spaced, sloping plates which define a plurality of superposed separating chambers,
   b. each chamber having a top plate, a bottom plate on which sediment settles and slides downward, a sludge inlet opening at the upper margin of said bottom plate which leads sludge onto the upper surface of that plate, and a discharge opening for sediment at the lower margin of the bottom plate,
   c. the size of each chamber being so correlated with the character and throughput rate of the sludge that the chamber has a sludge zone in its upper portion, a sediment zone at its lower portion, and a clear liquid zone which overlies the sediment zone;
   d. supply passage means for feeding sludge to be decanted in parallel to the inlet openings of the chambers; and
   e. an inclined duct for each chamber which is spaced vertically from the bottom plate and leads upward along said sludge zone from a lower region of the chamber which is at the top of said clear liquid zone to a clear liquid outlet adjacent the upper margin of the top plate, the duct providing a clear liquid discharge path which is isolated from the sludge in the chamber,
   f. each duct having an entrance at its lower end which faces downward in the direction of sludge flow along the bottom plate so that the duct receives ascending clarified liquid and that entry into the duct of descending sediment is precluded.

2. A decanter as defined in claim 1 in which each duct is defined by the top plate of the chamber, and a partition in the chamber which is located intermediate the top and bottom plates.

3. A decanter as defined in claim 2 in which each partition is parallel with the bottom plate of the associated chamber.

4. A decanter as defined in claim 2 in which each partition extends, at least for a portion of its length, at an inclination to the bottom plate of the associated chamber.

5. A decanter as defined in claim 1 in which
   a. the separating chambers are axially symmetrical annular chambers; and
   b. the sloping plates are frusto-conical shells.

6. A decanter as defined in claim 5 in which each duct is defined by the frusto-conical top plate, and a frusto-conical partition in the chamber which is coaxial with the chamber and is located intermediate the top and bottom plates.

7. A decanter as defined in claim 5 in which the sediment discharge opening of each chamber is formed between said bottom plate and a frusto-conical wall which depends from the lower margin of the top plate.

8. A decanter as defined in claim 7 in which
a. the bottom plate of each chamber and the depending frusto-conical wall of the top plate converge in the downward direction so that the vertical height of the chamber decreases toward the sediment discharge opening; and
b. the diameter of the lower margin of each of said depending walls is greater than the corresponding diameter of the next higher of those walls.

9. A decanter as defined in claim 5 in which
a. each chamber has a series of sludge inlet openings arranged around the circumference of the upper margin of the bottom plate; and
b. the supply passage means feeds sludge tangentially into said inlet openings.

* * * * *